United States Patent
Horibe et al.

(10) Patent No.: US 11,316,143 B2
(45) Date of Patent: Apr. 26, 2022

(54) STACKED DEVICE STRUCTURE

(71) Applicant: INTERNATIONAL BUSINESS MACHINES CORPORATION, Armonk, NY (US)

(72) Inventors: Akihiro Horibe, Kanagawa-ken (JP); Kuniaki Sueoka, Kanagawa-ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 112 days.

(21) Appl. No.: 16/405,104

(22) Filed: May 7, 2019

(65) Prior Publication Data
US 2020/0358087 A1    Nov. 12, 2020

(51) Int. Cl.
| | |
|---|---|
| *H01M 4/1391* | (2010.01) |
| *H01M 4/131* | (2010.01) |
| *H01M 10/0562* | (2010.01) |
| *H01M 10/058* | (2010.01) |
| *H01M 4/134* | (2010.01) |

(52) U.S. Cl.
CPC ......... *H01M 4/1391* (2013.01); *H01M 4/131* (2013.01); *H01M 4/134* (2013.01); *H01M 10/058* (2013.01); *H01M 10/0562* (2013.01)

(58) Field of Classification Search
CPC .... H01M 4/1391; H01M 4/131; H01M 4/134; H01M 10/0562; H01M 10/058
See application file for complete search history.

(56) References Cited

U.S. PATENT DOCUMENTS

| | | | | |
|---|---|---|---|---|
| 5,269,880 | A * | 12/1993 | Jolly ................. | H01L 21/02063 148/DIG. 161 |
| 6,706,997 | B1 * | 3/2004 | Stacker ................. | B23K 26/06 219/121.71 |
| 8,129,833 | B2 | 3/2012 | Kang et al. | |
| 9,167,694 | B2 | 10/2015 | Sundaram et al. | |
| 9,515,006 | B2 | 12/2016 | Reber et al. | |
| 9,517,963 | B2 | 12/2016 | Marjanovic et al. | |

(Continued)

FOREIGN PATENT DOCUMENTS

| | | |
|---|---|---|
| CN | 106104902 A | 9/2016 |
| WO | 2019030597 A1 | 2/2019 |

OTHER PUBLICATIONS

Knowles, M. & Rutterford, G. & Karnakis, Dimitris & Ferguson, A.. (2007). Micromachining of metals, ceramics and polymers using nanosecond lasers. International Journal of Advanced Manufacturing Technology—Int J Adv Manuf Technol. 33. 95-102. 10.1007/s00170-007-0967-2. (Year: 2007).*

(Continued)

*Primary Examiner* — Maria Laios
*Assistant Examiner* — Adam J Francis
(74) *Attorney, Agent, or Firm* — Tutunjian & Bitetto PC; Randall Bluestone

(57) ABSTRACT

A method for fabricating a stacked device structure includes preparing plural device layers each having a glass layer, a metal layer, and a resin layer. The metal layer corresponds to one of plural metal layers. The method further includes stacking the plural device layers to compose stacked device layers; and drilling vertically a hole into the stacked device layers by laser such that the plural metal layers are exposed to the hole and filling conductive material into the hole to connect the plural metal layers.

22 Claims, 15 Drawing Sheets

(56) References Cited

U.S. PATENT DOCUMENTS

| | | | |
|---|---|---|---|
| 2009/0136839 A1 | 5/2009 | Kraznov et al. | |
| 2010/0291431 A1* | 11/2010 | Shih | H01M 50/10 |
| | | | 429/159 |
| 2015/0372346 A1 | 12/2015 | Sastry et al. | |
| 2016/0056129 A1 | 2/2016 | Horibe et al. | |
| 2016/0087579 A1* | 3/2016 | Moslehi | H01L 31/0201 |
| | | | 136/251 |
| 2017/0104195 A1 | 4/2017 | Bedjaoui et al. | |
| 2017/0222280 A1* | 8/2017 | Asano | H01M 10/0463 |
| 2018/0083304 A1 | 3/2018 | Horibe et al. | |

OTHER PUBLICATIONS

European ISR & WO issued in PCT Application No. IB2020/053809 dated Jul. 29, 2020, pp. 1-9.

* cited by examiner

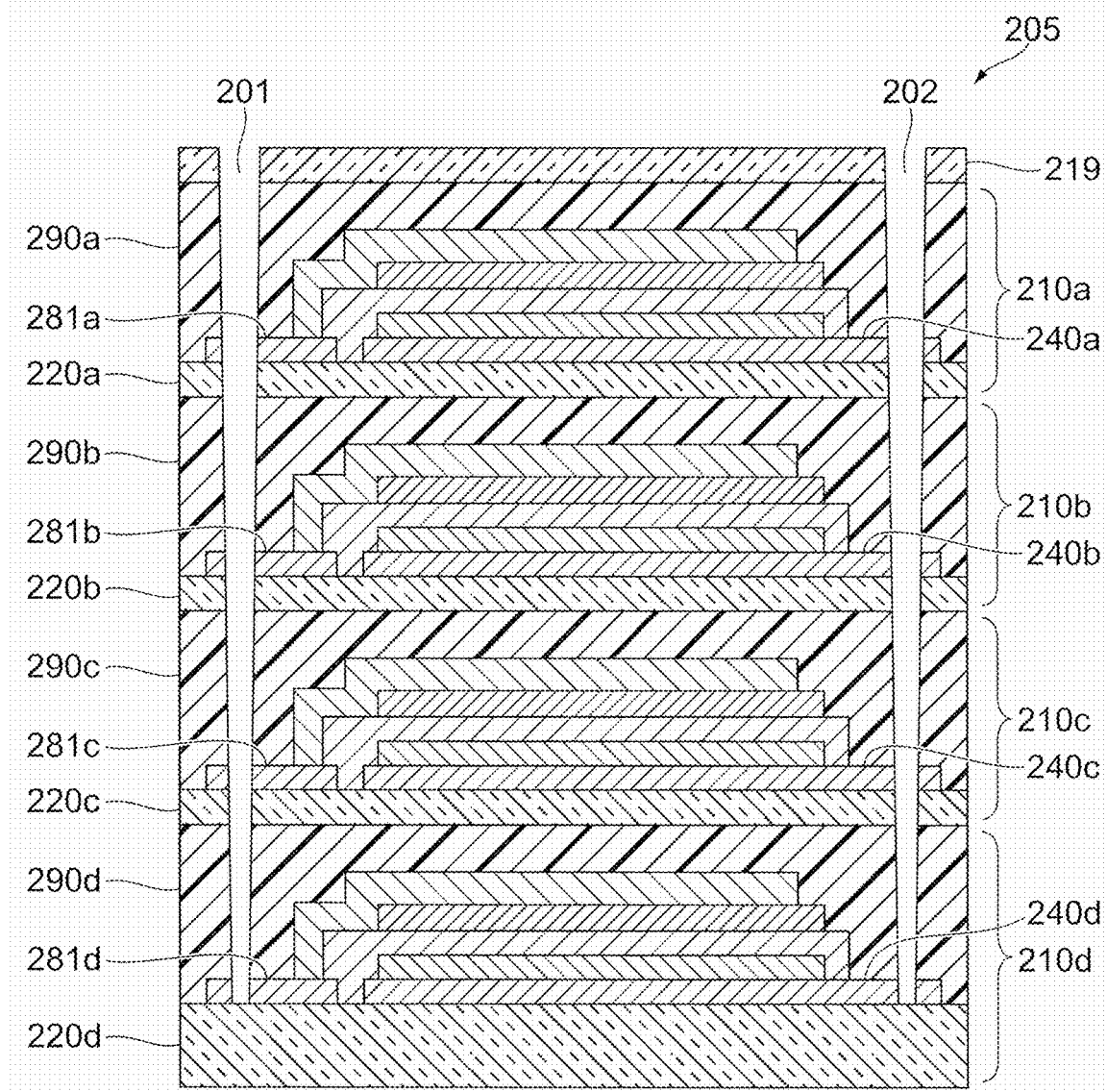

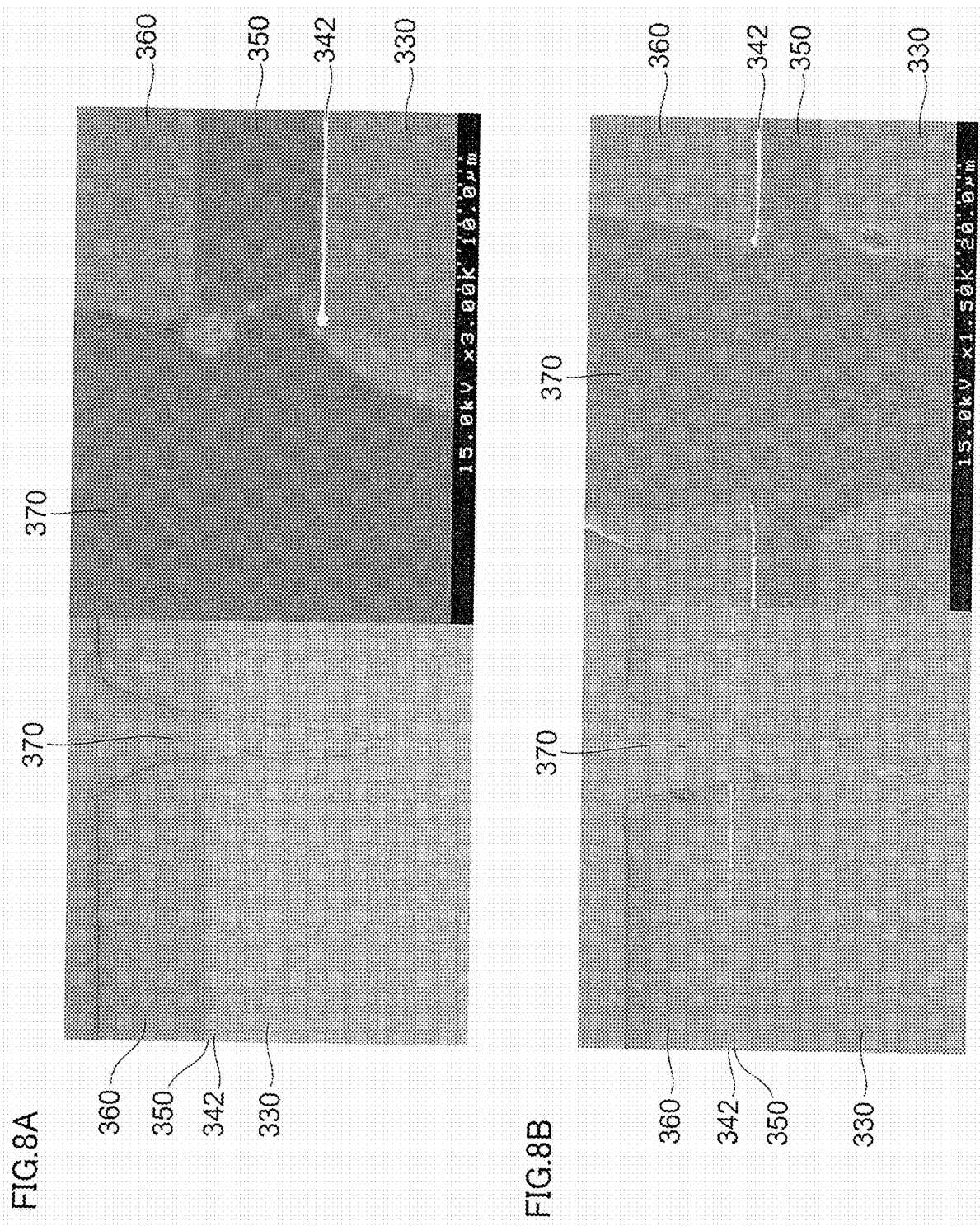

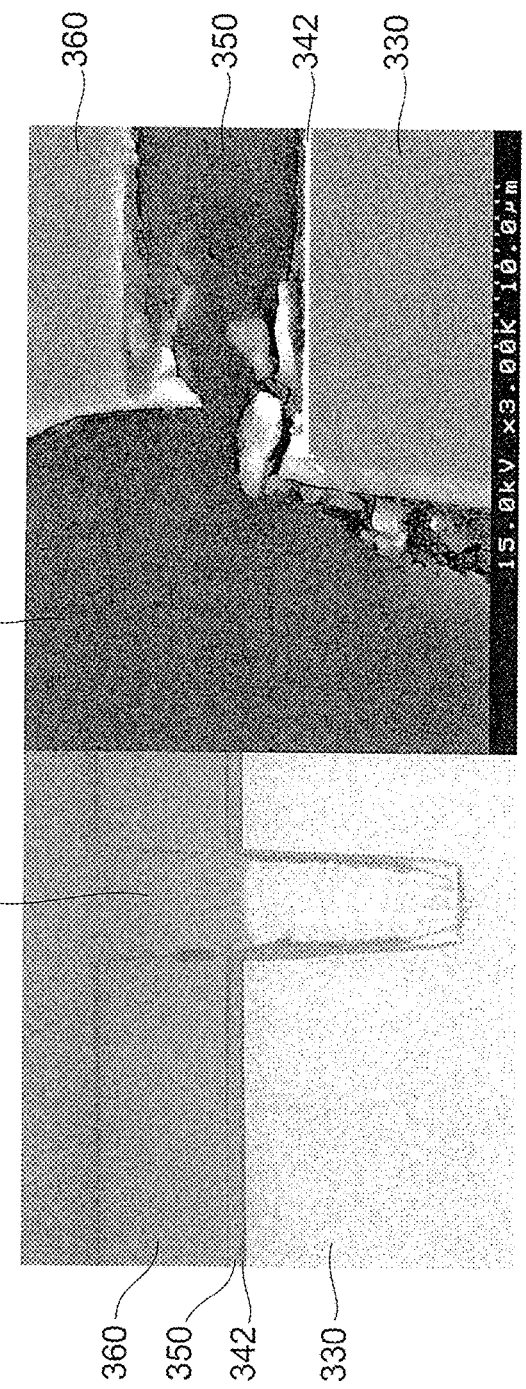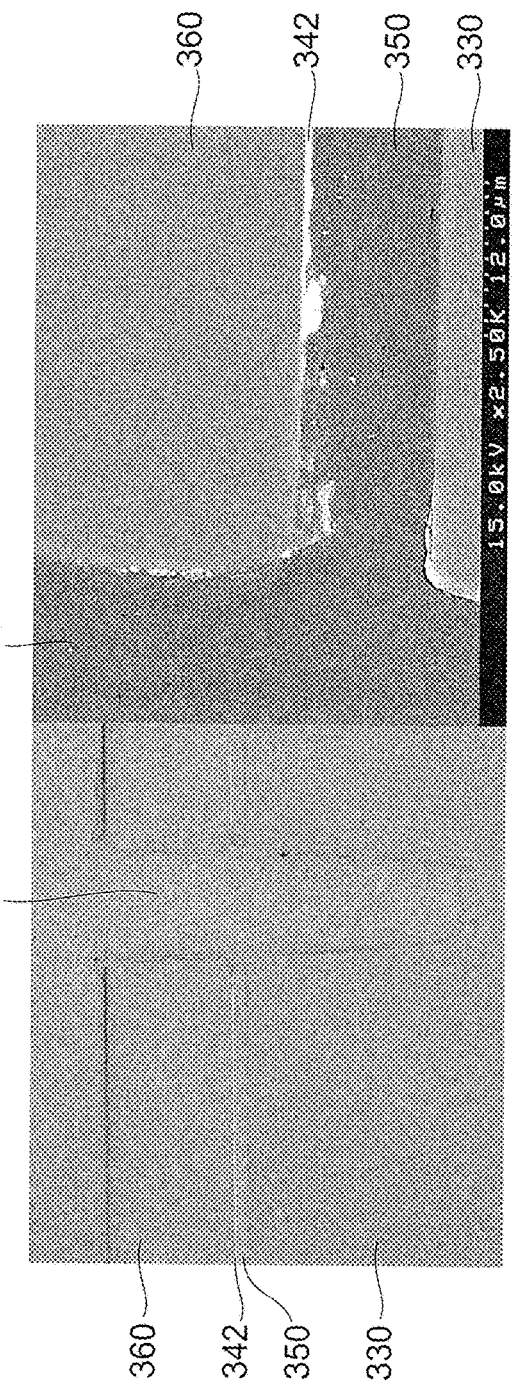

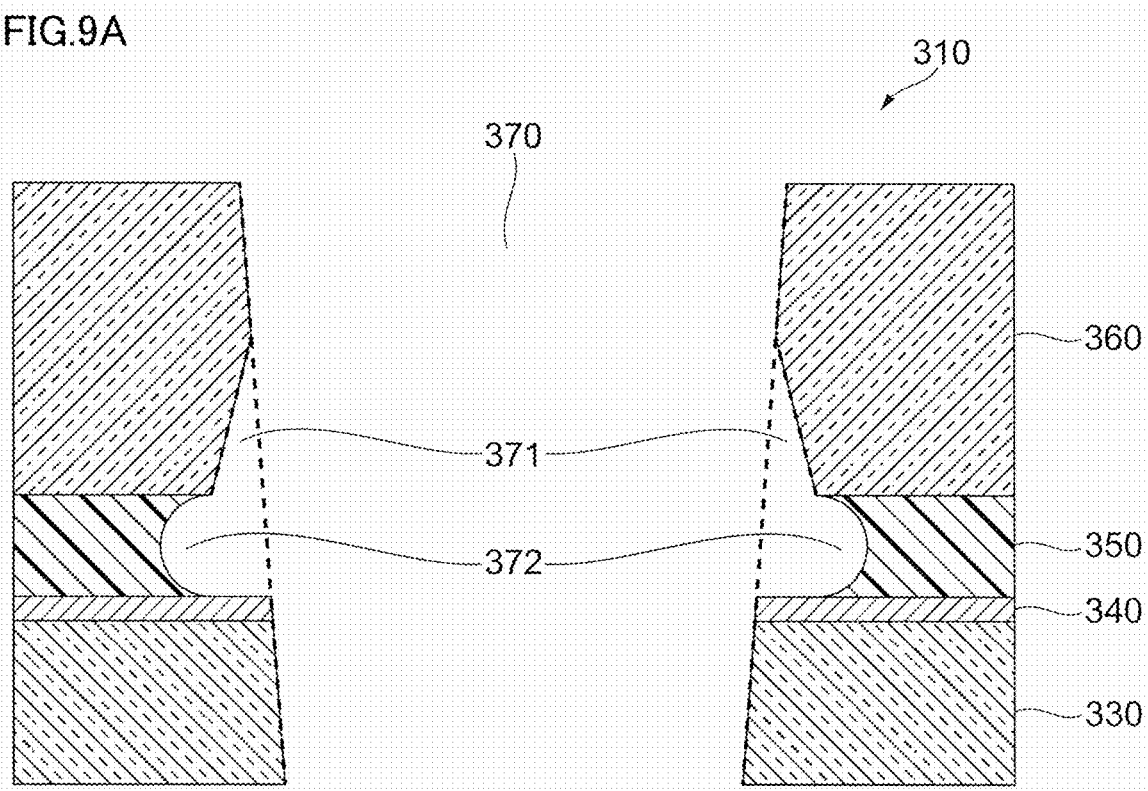
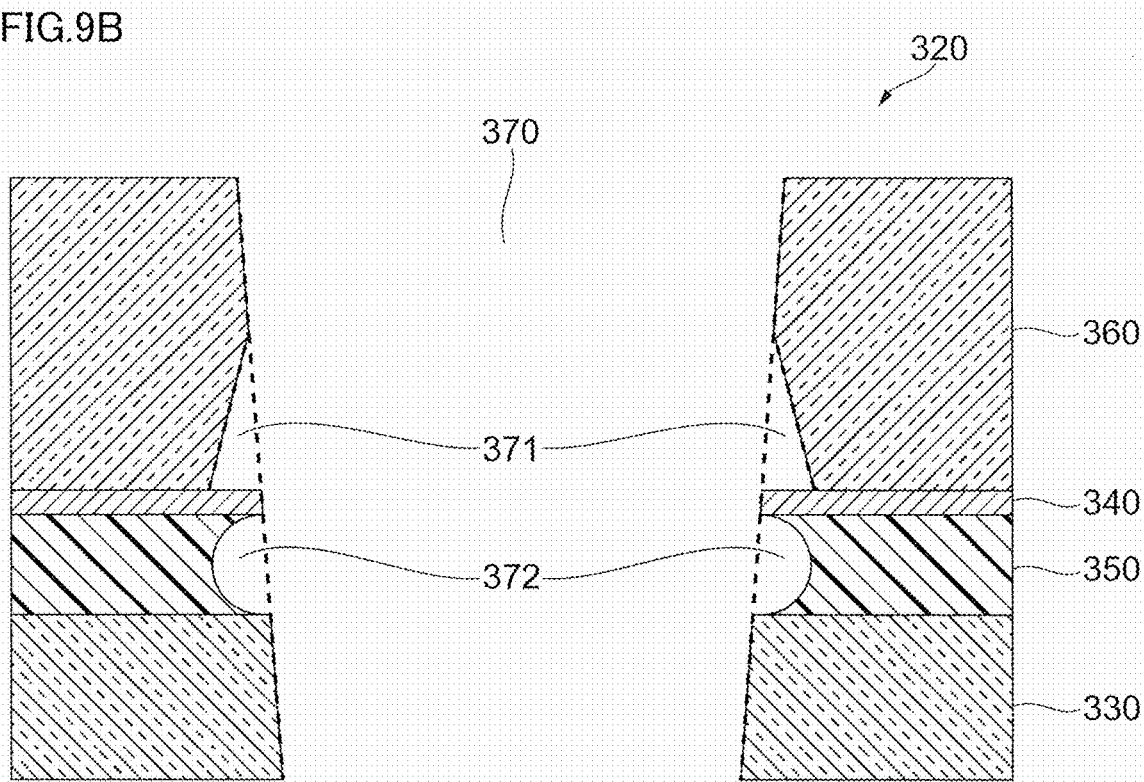

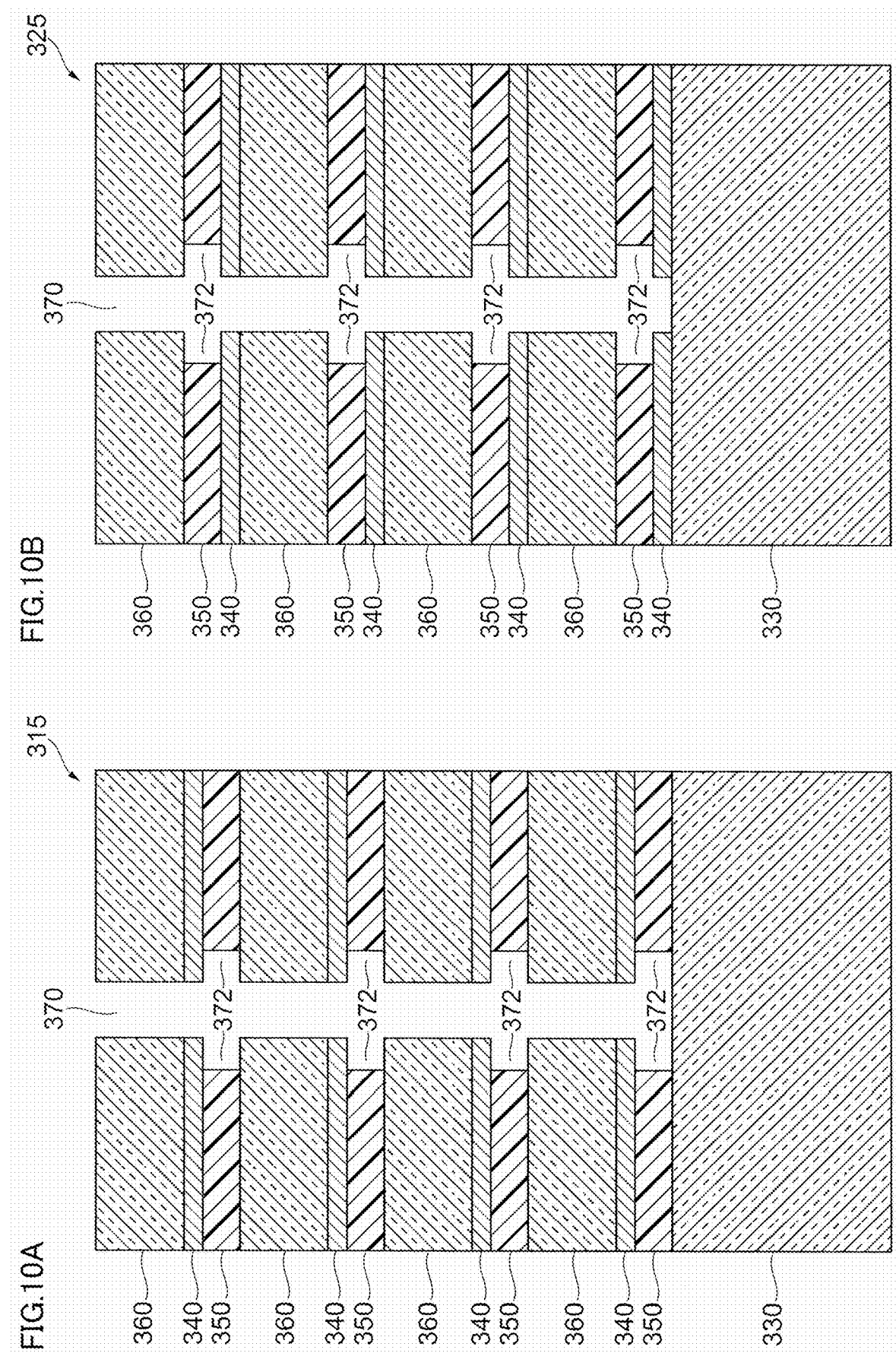

STACKED DEVICE STRUCTURE

BACKGROUND

The present invention generally relates to stacked device technology, and more particularly, to a stacked device structure and a fabricating method thereof.

Fabrication of a stacked device structure (e.g., a stacked battery structure) includes a vertical connection of plural metal layers that function as electrodes. A low cost method of making such a vertical connection at a low cost is provided.

SUMMARY

According to an embodiment of the present invention, there is provided a method for fabricating a stacked battery structure. The method includes preparing a plurality of battery layers each having a glass layer, a metal layer, a resin layer, and battery elements The metal layer including a corresponding one of a plurality of anode electrodes and a corresponding one of a plurality of cathode electrodes The battery elements including an anode coupled to the corresponding one of the plurality of anode electrodes, a cathode coupled to the corresponding one of the plurality of cathode electrodes, and an electrolyte deposited between the anode and the cathode. The method further includes stacking the plurality of battery layers to compose stacked battery layers. The method further includes drilling vertically a first hole and a second hole into the stacked battery layers by laser such that the plurality of anode electrodes are exposed to the first hole and the plurality of cathode electrodes are exposed to the second hole. The method further includes filling conductive material into the first hole to connect the plurality of anode electrodes, and into the second hole to connect the plurality of cathode electrodes.

According to another embodiment of the present invention, there is provided a method for fabricating a stacked device structure. The method includes preparing a plurality of device layers each having a glass layer, a metal layer, and a resin layer. The metal layer being a corresponding one of a plurality of metal layers. The method further includes stacking the plurality of device layers to compose stacked device layers. The method further includes drilling vertically a hole into the stacked device layers by laser such that the plurality of metal layers are exposed to the hole. The method further includes filling conductive material into the hole to connect the plurality of metal layers.

According to still another embodiment of the present invention, there is provided a stacked battery structure. The stacked battery structure includes stacked battery layers in which a plurality of battery layers are stacked. Each of the plurality of battery layers having a glass layer, a metal layer, a resin layer, and battery elements. The metal layer including a corresponding one of a plurality of anode electrodes and a corresponding one of a plurality of cathode electrodes The battery elements including an anode coupled to the corresponding one of the plurality of anode electrodes, a cathode coupled to the corresponding one of the plurality of cathode electrodes, and an electrolyte deposited between the anode and the cathode. The stacked battery layers having a first vertical laser-drilled hole to which the plurality of anode electrodes are exposed and a second vertical laser-drilled hole to which the plurality of cathode electrodes are exposed. The stacked battery structure further includes conductive material filled in the first vertical laser-drilled hole to connect the plurality of anode electrodes, and filled in the second vertical laser-drilled hole to connect the plurality of cathode electrodes.

According to still another embodiment of the present invention, there is provided a stacked device structure. The stacked device structure includes stacked device layers in which a plurality of device layers are stacked. Each of the plurality of device layers having a glass layer, a metal layer, and a resin layer. The metal layer being a corresponding one of a plurality of metal layers. The stacked device layers having a vertical laser-drilled hole to which the plurality of metal layers are exposed. The stacked device structure further includes conductive material filled in the vertical laser-drilled hole to connect the plurality of metal layers.

According to still another embodiment of the present invention, there is provided an electronic apparatus. The electronic apparatus includes: a stacked device structure; and a signal processor configured to process a signal outputted from the stacked device structure. The stacked device structure includes stacked device layers in which a plurality of device layers are stacked, each of the plurality of device layers having a glass layer, a metal layer, and a resin layer. The metal layer being a corresponding one of a plurality of metal layers. The stacked device layers having a vertical laser-drilled hole to which the plurality of metal layers are exposed. The stacked device structure further includes conductive material filled in the vertical laser-drilled hole to connect the plurality of metal layers.

BRIEF DESCRIPTION OF THE DRAWINGS

FIG. 4 depicts a cross-sectional view of the stacked battery layers while a via hole drilling step of FIG. 1 is being executed.

FIGS. 8A, 8B, 8C, and 8D each depicts a cross-section image of the via hole drilled by laser when a platinum pad is used.

FIGS. 9A and 9B are enlarged schematic drawings each illustrating a portion where a glass substrate and an adhesive resin are scraped by laser.

FIGS. 10A and 10B depict etching results with a thermally dissipatable resin used as the adhesive resin.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

In the first exemplary embodiment, an explanation is given of a fabrication of a stacked battery structure.

Figure 1:
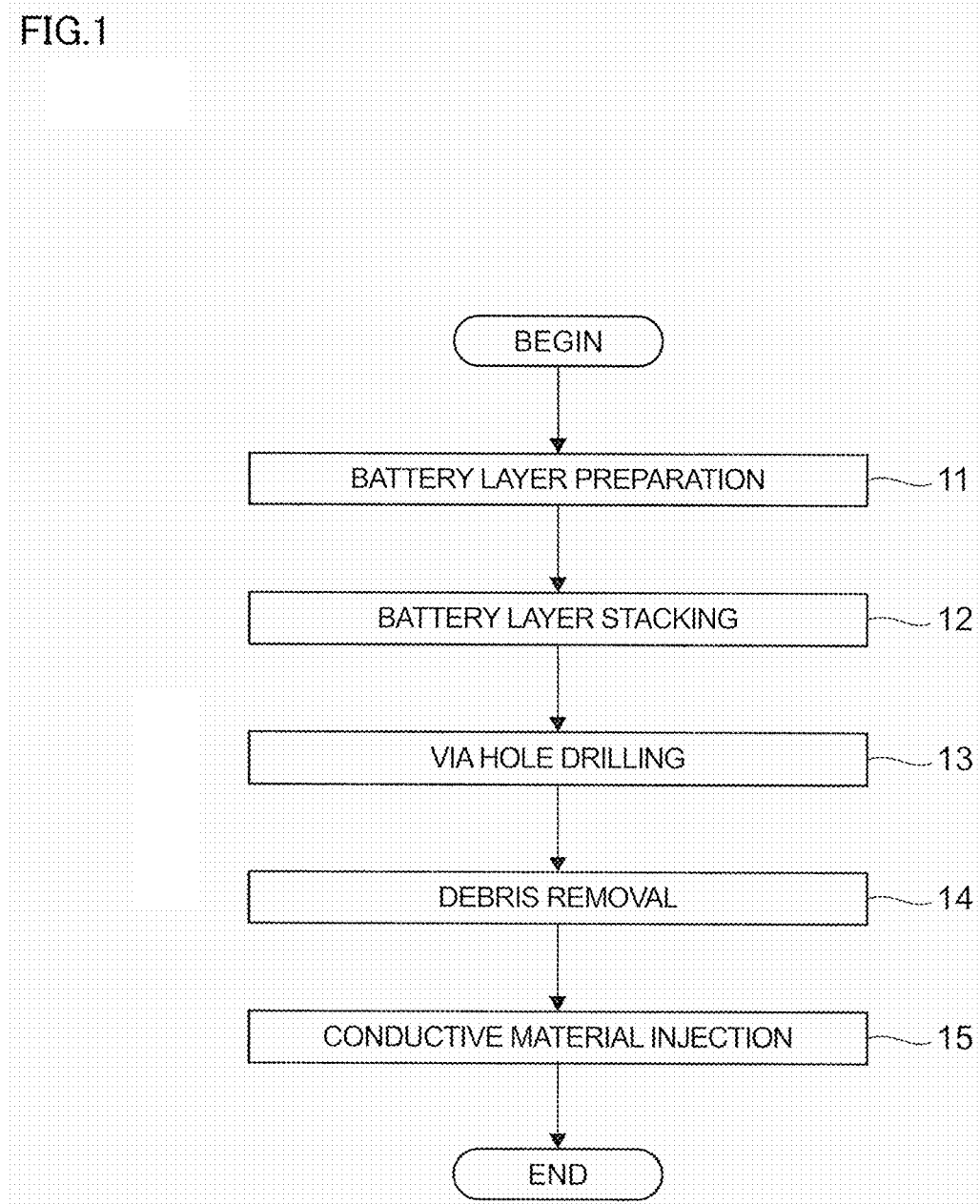
FIG. 1 depicts a flowchart representing an example of a fabrication procedure of a stacked battery structure according to the first exemplary embodiment of the present invention.

Referring to FIG. 1, there is shown a flowchart representing an example of a fabrication procedure of the stacked battery structure according to the first exemplary embodiment. As shown in FIG. 1, the fabrication procedure may include, in time order, a battery layer preparation step 11, a battery layer stacking step 12, a via hole drilling step 13, a debris removal step 14, and a conductive material injection step 15.

Figure 2:
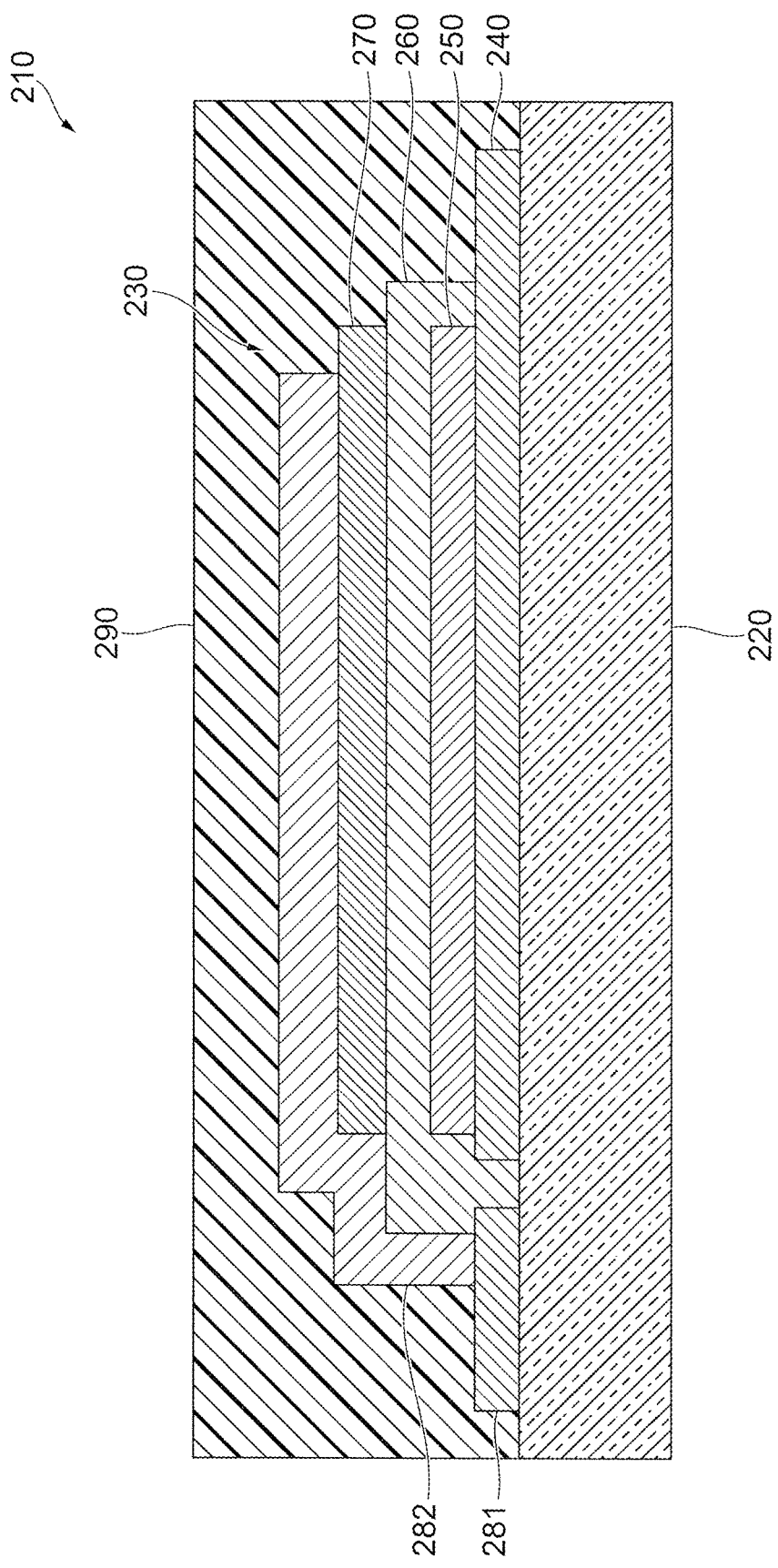
FIG. 2 depicts a cross-sectional view of a battery layer after a battery layer preparation step of FIG. 1 is completed.

Referring to FIG. 2, there is shown a cross-sectional view of a battery layer 210 after the battery layer preparation step 11 of FIG. 1 is completed. As shown in FIG. 2, the battery layer 210 may include a glass substrate 220. The battery layer 210 may further include battery elements 230. The battery elements 230 may include a cathode current collector 240 with a cathode electrode, a cathode 250, an electrolyte 260, an anode 270, an anode electrode 281, and an anode current collector 282. The battery layer 210 may furthermore include an insulator 290.

The battery layer 210 may be fabricated as follows.

First, the glass substrate 220 may be prepared. The glass substrate 220 serves as one example of the claimed glass layer.

Next, the anode electrode 281 and the cathode current collector 240 with the cathode electrode may be deposited each as one of the battery elements 230 on the glass substrate 220. The anode electrode 281 and the cathode electrode of the cathode current collector 240 may be made of any one metal (e.g., Cu, Pt, Al, Au, etc.). A portion of the cathode current collector 240 other than the cathode electrode may be made of any one metal (e.g., Cu, Pt, Al, Au, etc.) and other conductive materials (e.g., graphite, carbon nanotube, silicon, etc.) as long as it is adequate for material of the cathode 250. The layer including the cathode electrode of the cathode current collector 240 and the anode electrode 281 serves as one example of the claimed metal layer.

Next, the cathode 250 may be deposited as one of the battery elements 230 on the cathode current collector 240. The cathode 250 may be made of crystalline or nanocrystalline lithium intercalation compounds such as $LiCoO_2$, $LiMn_2O_4$, etc. to name but a few. The material of the cathode 250 may be deposited by using vapor deposition technique such as sputtering, and a film obtained by low temperature deposition may be annealed at a predetermined annealing temperature in a range of 500-700 degrees Celsius to obtain fully crystalline phases. This annealing temperature limits the selection of material for the glass substrates 220. Non-alkaline glass, which has a high strain point around 670 degrees Celsius, may be used as the glass substrate 220.

Next, the electrolyte 260 may be deposited as one of the battery elements 230 on the cathode 250. The electrolyte 260 may include solid electrolytes such as ceramic electrolyte including lithium oxide based electrolytes (e.g., lithium phosphorus oxynitride (LiPON), lithium lanthanum titanium oxide (LLTO), etc.), lithium sulfide based electrolytes and other lithium phosphate based electrolytes (e.g., lithium borophosphate (LiBP), etc.). The LiPON can be preferably used for the electrolyte 260 since it has a preferable ionic conductivity and electrochemical stability. The electrolyte 260 may be deposited by using vapor deposition technique such as sputtering. In an embodiment shown in FIG. 2, the electrolyte 260 may be deposited on the cathode 250 so as to fully cover a surface and edges of the cathode 250.

Next, the anode 270 may be deposited as one of the battery elements 230 on the electrolyte 260. The anode 270 may include silicon and/or materials that have a melting point higher than a curing temperature of the insulator 290. Specifically, the anode 270 may be an Li-ion anode, in which the anode 270 is formed by electroplating of metallic lithium or lithiation at the interface between the electrolyte 260 and the anode current collector 282 upon the initial charge. Alternatively, the anode 270 may be an Li-free anode such as silicon tin oxynitride (SiTON), tin and zinc nitrides.

Next, the anode current collector 282 may be deposited as one of the battery elements 230 on the anode electrode 281 and the anode 270. The anode current collector 282 may be made of any one metal (e.g., Cu, Pt, Al, Au, etc.) and other conductive materials (e.g., graphite, carbon nanotube, silicon, etc.) as long as it is adequate for material of the anode 270.

Finally, the glass substrate 220 and the battery elements 230 may be coated with the insulator 290 to form the battery layer 210. The insulator 290 may be made from a resin, which may have a predetermined curing temperature in a range of 50-350 degrees Celsius, more preferably 150-250 degrees Celsius. Laser-processable insulator materials that can be drilled by laser may be also used for the insulator 290. The insulator 290 serves as one example of the claimed resin layer.

Referring to FIGS. 3A, 3B, 3C, and 3D, there are shown cross-sectional views of a stacked battery layer 215 or stacked battery layers 205 while the battery layer stacking step 12 of FIG. 1 is being executed. The stacked battery layer 215 may be formed on the way of fabricating the stacked battery structure and may include a battery layer 210a. The stacked battery layers 205 may be formed on the way of fabricating the stacked battery structure and may include battery layers 210a, 210b, 210c, and 210d. Note that in FIGS. 3C and 3D, the stacked battery structure is assumed to have four battery layers 210a to 210d. However, the number of the battery layers 210 may not be limited to the specific embodiment shown in FIGS. 3C and 3D. In one or more other embodiments, more than four battery layers may be stacked to form the stacked battery structure.

Figure 3A:
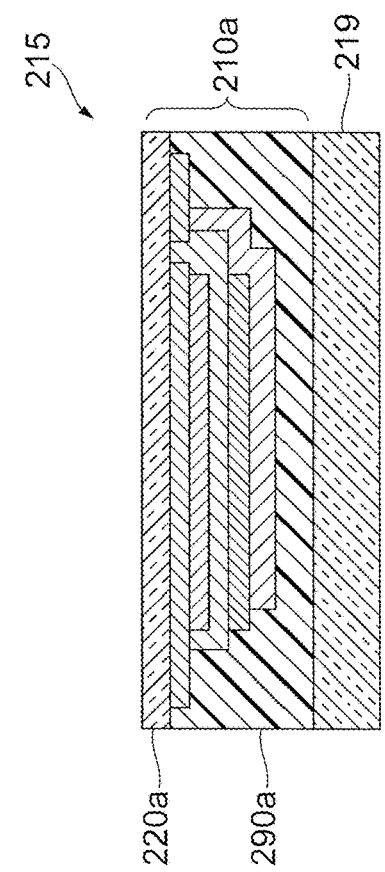
FIGS. 3A, 3B, 3C, and 3D depict cross-sectional views of a stacked battery layer or stacked battery layers while a battery layer stacking step of FIG. 1 is being executed.

FIG. 3A shows a cross-sectional view of the stacked battery layer 215 while the first stage of the battery layer stacking step 12 is being executed. As shown in FIG. 3A, the battery layer 210a may be stacked face down on a glass carrier 219.

Figure 3B:
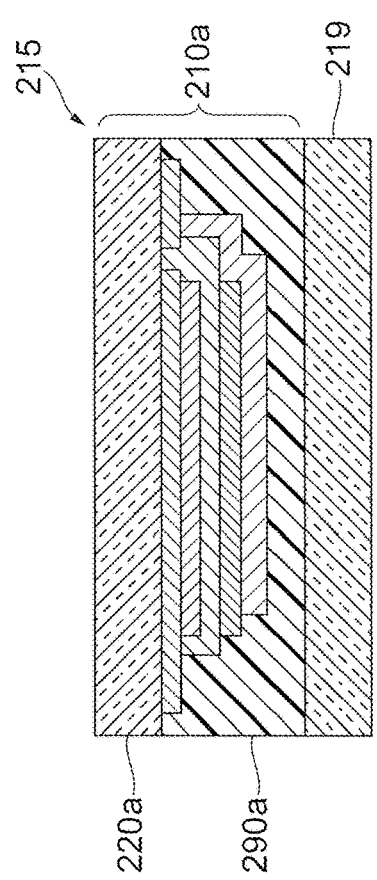

FIG. 3B shows a cross-sectional view of the stacked battery layer 215 while the second stage of the battery layer stacking step 12 is being executed. An insulator layer 290a is positioned between glass substrate 220a and glass carrier 219. As shown in FIG. 3B, a glass substrate 220a of the battery layer 210a may be grinded.

Figure 3D:
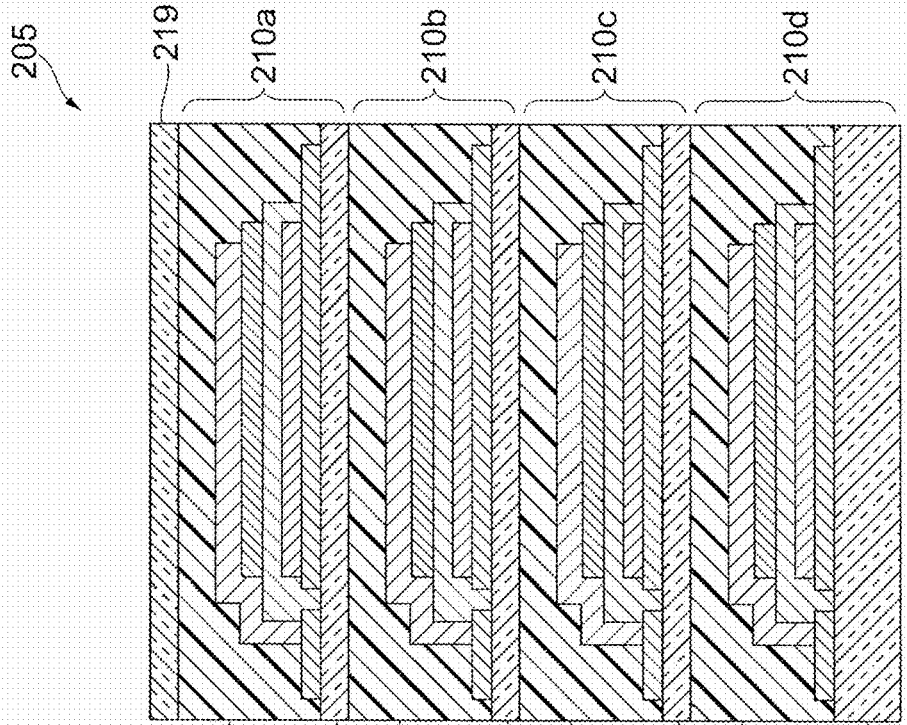
Figure 3C:
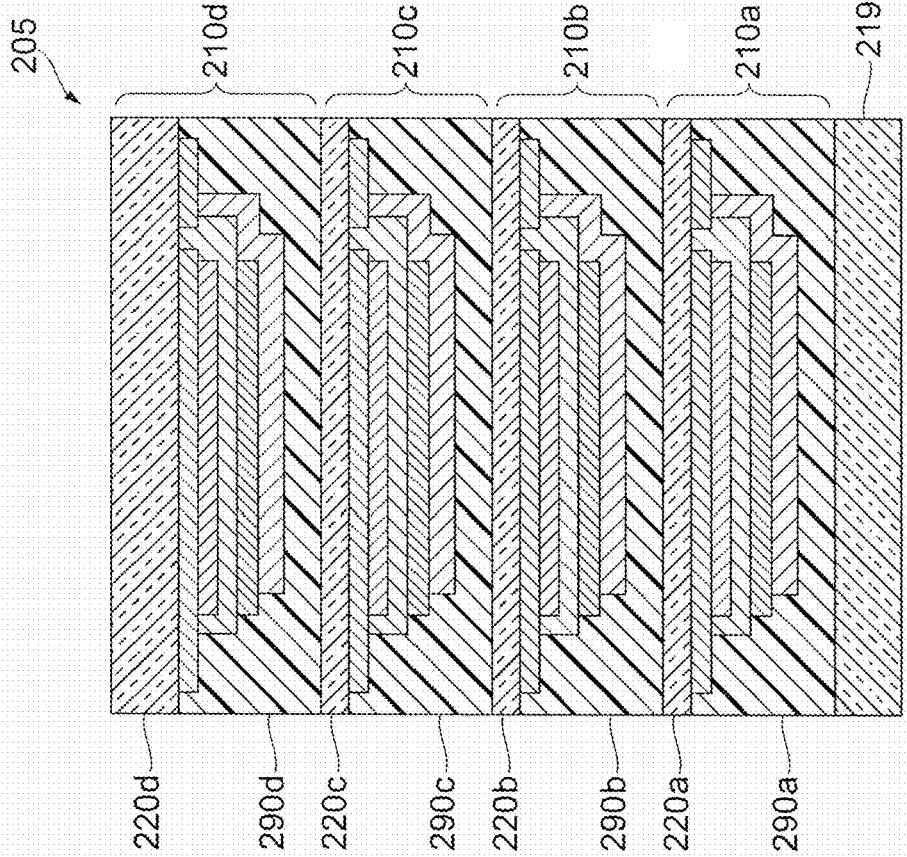

FIG. 3C shows a cross-sectional view of the stacked battery layers 205 while the third stage of the battery layer stacking step 12 is being executed. In this stage, operations indicated by FIGS. 3A and 3B may be repeated. Specifically, an insulator layer 290b of a battery layer 210b may be stacked face down on the battery layer 210a, and a glass substrate 220b of the battery layer 210b may be grinded. Similarly, an insulator layer 290c of a battery layer 210c may be stacked face down on the battery layer 210b, and a glass substrate 220c of the battery layer 210c may be grinded. Further, an insulator layer 290d of a battery layer 210d may be stacked face down on the battery layer 210c. In this case, however, a glass substrate 220d of the battery layer 210d may not be grinded, as shown in FIG. 3C.

FIG. 3D shows a cross-sectional view of the stacked battery layers 205 while the fourth stage of the battery layer stacking step 12 is being executed. As shown in FIG. 3D, the stacked battery layers 205 may be flipped, and the glass carrier 219 may be grinded.

Referring to FIG. 4, there is shown a cross-sectional view of the stacked battery layers 205 while the via hole drilling step 13 of FIG. 1 is being executed. As shown in FIG. 4, a via hole 201 may be drilled such that the anode electrodes 281a, 281b, 281c, and 281d are exposed to the via hole 201, and a via hole 202 may be drilled such that the cathode electrodes of the cathode current collectors 240a, 240b, 240c, and 240d are exposed to the via hole 202. To drill the via holes 201 and 202, laser may be used. The via hole 201 serves as one example of the claimed first hole and the claimed first vertical laser-drilled hole, and the via hole 202 serves as one example of the claimed second hole and the claimed second vertical laser-drilled hole. Details of the process of the via hole drilling step 13 will be described later.

After that, debris produced at the via hole drilling step 13 is removed at the debris removal step 14.

Figure 5:
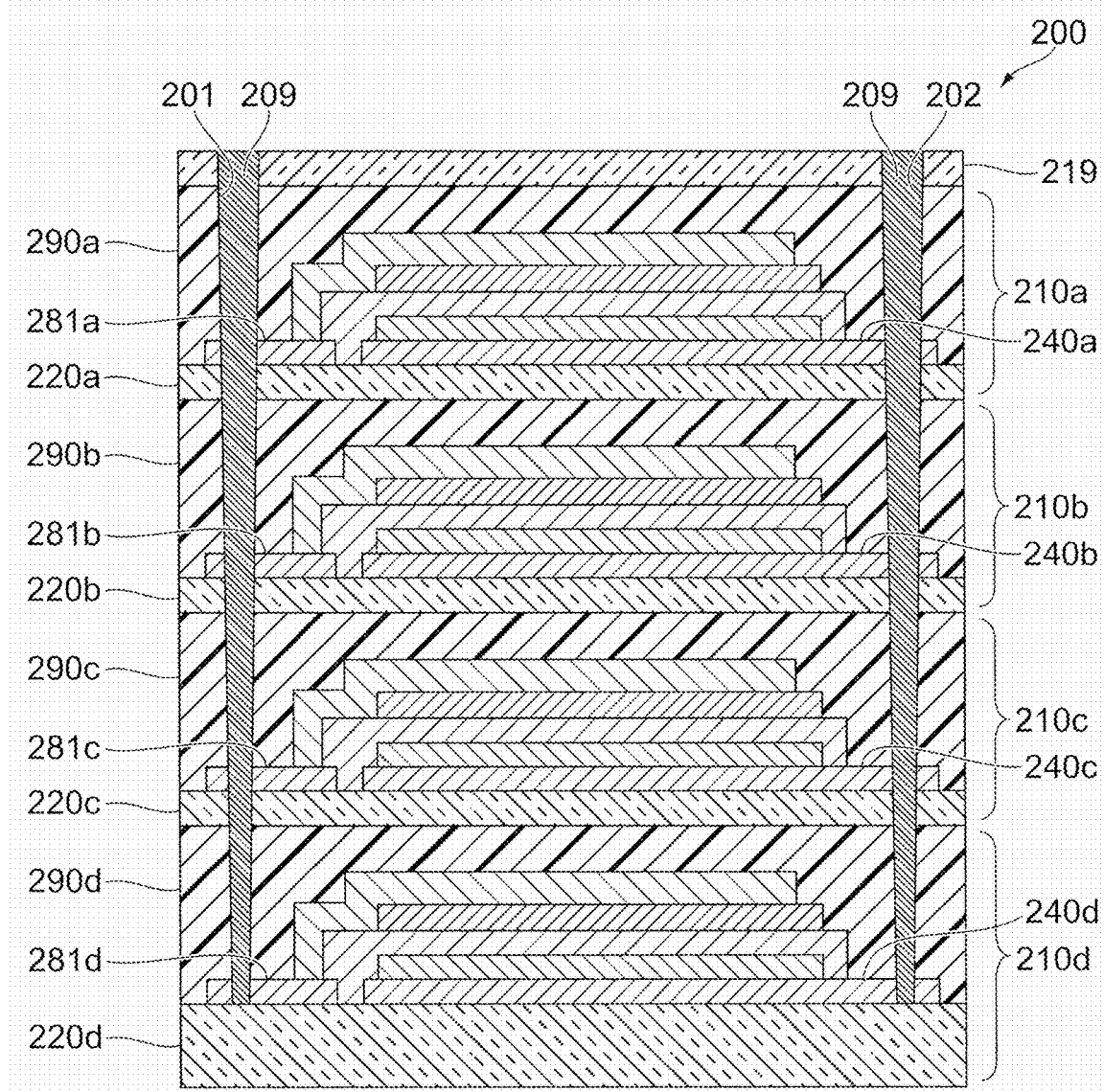
FIG. 5 depicts a cross-sectional view of the stacked battery structure after a conductive material injection step of FIG. 1 is completed.

Referring to FIG. 5, there is shown a cross-sectional view of the stacked battery structure 200 after the conductive material injection step 15 of FIG. 1 is completed. As shown in FIG. 5, a conductive material 209 may be injected into the via holes 201 and 202. The conductive material may be solder, conductive paste, and the like. Injection molded solder (IMS) may be used for injection of the conductive material. Thus, a vertical electrical connection among the anode electrodes 281a, 281b, 281c, and 281d, and a vertical electrical connection among the cathode electrodes of the cathode current collectors 240a, 240b. 240c, and 240d may be fabricated.

The process of the via hole drilling step 13 will be described in detail below.

To drill the via holes 201 and 202 into the stacked battery layers 205 including the glass carrier 219 and the glass substrates 220 made of non-alkaline glass, $CO_2$ laser (wavelength 9.3 micrometers) or excimer laser (wavelength 248 nanometers (KrF)) may be used. It is because non-alkaline glass has high absorbance in an IR region (wavelength longer than 6 micrometers) or a UV region (wavelength shorter than 300 nanometers). The diameter of each of the via holes 201 and 202 may be preferably 100 micrometers. The depth of each of the via holes 201 and 202 may be preferably 100 to 300 micrometers depending on the number of the battery layers 210 to be stacked.

The performance of the laser drilling is affected by the structure of the stacked battery layers 205, and materials used for the stacked battery layers 205 (e.g., the glass substrate 220, the anode electrode 281, the cathode electrode of the cathode current collector 240, and the insulator 290). In the first embodiment, the present inventors evaluated two types of structure of the stacked battery layers 205, and various metals as the anode electrode 281 and the cathode electrode of the cathode current collector 240.

Figure 6A:
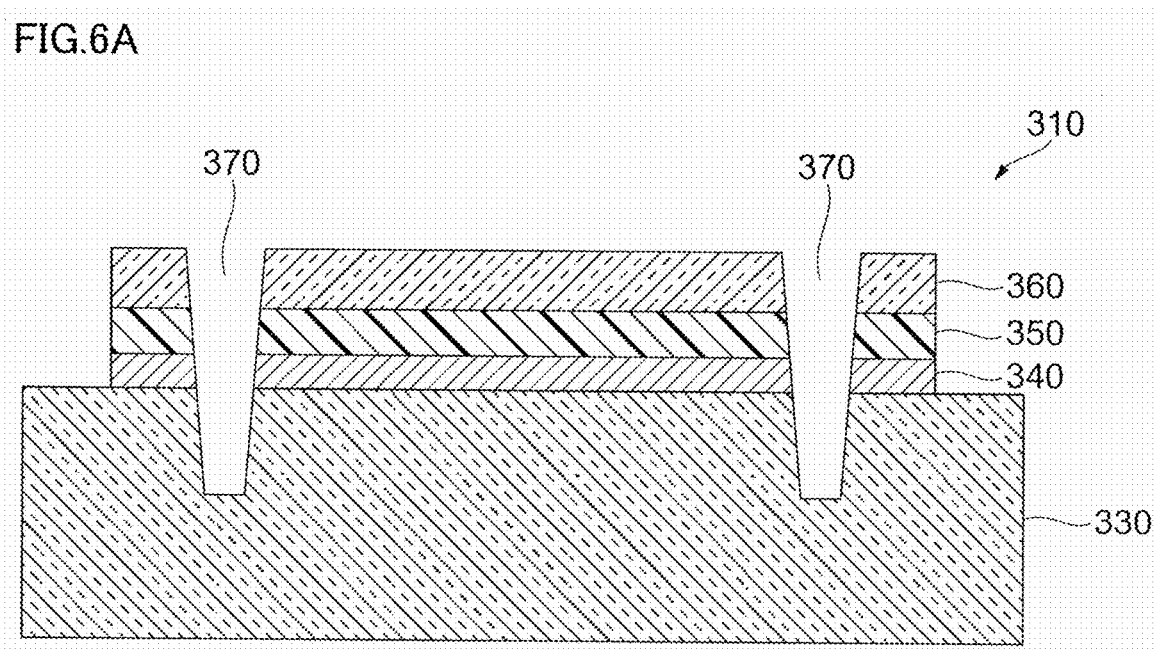
FIGS. 6A and 6B depict stacked battery layers used as test sample structures.
Figure 6B:
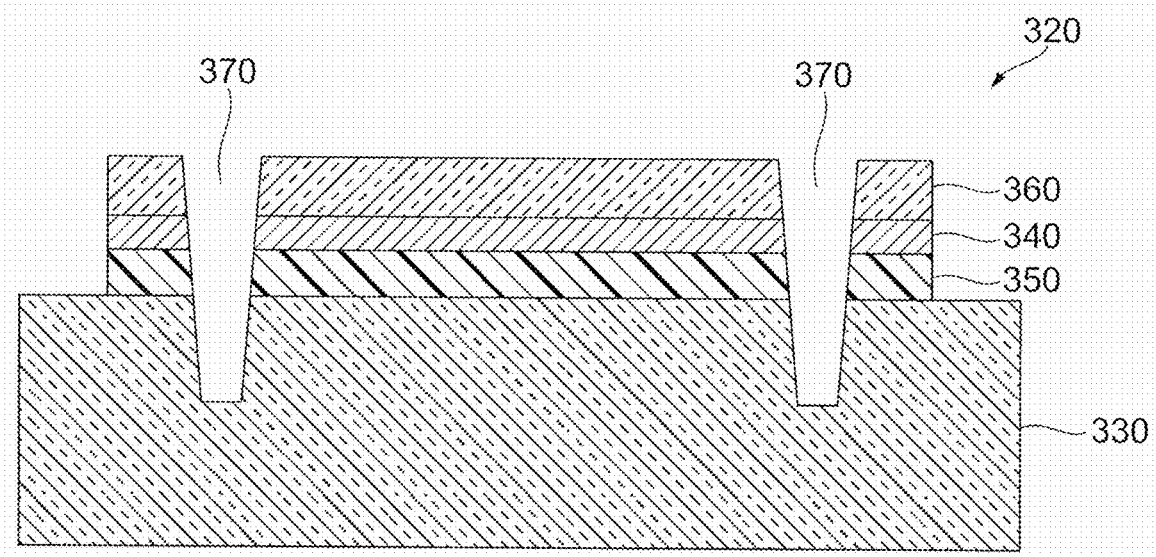

Referring to FIGS. 6A and 6B, there are shown stacked battery layers 310 and 320, respectively, used as test sample structures. Both of the stacked battery layers 310 and 320 correspond to the stacked battery layers 205 of FIG. 4, and include a glass substrate 330, a metal pad 340, an adhesive resin 350, and a glass substrate 360. The glass substrate 330 corresponds to the glass substrate 220 of FIG. 4, with a height of 700 micrometers. The metal pad 340 corresponds to the anode electrode 281 and the cathode electrode of the cathode current collector 240 of FIG. 4, with a height of 200 nanometers. The adhesive resin 350 corresponds to the insulator 290 of FIG. 4, with a height of 10 micrometers. The glass substrate 360 corresponds to the glass carrier 219 of FIG. 4, with a height of 100 micrometers. Note that, both of the stacked battery layers 310 and 320 do not include members corresponding to any one of the battery elements 230 other than the anode electrode 281 and the cathode electrode of the cathode current collector 240. Further, both of the stacked battery layers 310 and 320 are assumed to include only one battery layer 210, although the stacked battery layers 205 include four battery layers 210. In addition, via holes 370 are drilled into both of the stacked battery layers 310 and 320.

The stacked battery layer 310 of FIG. 6A assumed a face-up battery. Thus, the adhesive resin 350 is located on the metal pad 340 in FIG. 6A. The stacked battery layer 320 of FIG. 6B assumed a face-down battery. Thus, the adhesive resin 350 is located under the metal pad 340. The stacked battery layer 310 of FIG. 6A may be fabricated by the process shown in FIGS. 2 to 5, while the stacked battery layer 320 of FIG. 6B may be fabricated by the process shown in FIGS. 2 to 5 but without flipping the stacked battery layers 205 indicated by FIG. 3D.

Table 1 lists physical properties of the metals evaluated as options for the metal pad 340. Each metal has a different melting point, thermal conductivity and optical absorption for the excimer (KrF) laser. During the laser drilling process, a higher etching resistance of the metal pad 340 compared with the etching resistance of the adhesive resin 350 and the glass substrate 360 is preferable because the metal pad 340 of such a higher etching resistance can protrude from side walls of the via holes 370 as a result of the laser drilling, which ensures reliable electrical connections between the conductive material and the metal pad 340. That is, both of etch rates of the adhesive resin 350 and the glass substrate 360 by laser are preferably higher than an etch rate of the metal pad 340 by the laser.

In terms of material properties, a high melting point and high thermal conductivity are preferable. Further, low absorption is preferable. For example, assuming that the laser has a first wavelength shorter than 300 nanometers, an absorption rate of the glass substrate 360 at the first wavelength is preferably higher than an absorption rate of the metal pad 340 at the first wavelength. Alternatively, assuming that the laser has a second wavelength longer than 6 micrometers, an absorption rate of the glass substrate 360 at the second wavelength is preferably higher than an absorption rate of the metal pad 340 at the second wavelength. However, such a material possessing all these advantageous properties (a high melting point, high thermal conductivity, and low absorption) does not exist among the materials listed in Table 1.

TABLE I

PHYSICAL PROPERTIES OF METALS.

| | M.P (° C.) | T.C. (W m$^{-1}$ K$^{-1}$) | Absorption (%@248 nm) |
|---|---|---|---|
| Al | 660 | 236 | 10-15 |
| Ag | 961 | 428 | ~40 |
| Cu | 1083 | 403 | 75-80 |
| Ni | 1455 | 94 | 55-60 |
| Ti | 1727 | 22 | 75-80 |
| Pt | 1774 | 72 | 70 |

(M.P.: Melting point, T.C.: Thermal conductivity)

First, the present inventors used an aluminum pad 341 as the metal pad 340.

Figure 7:
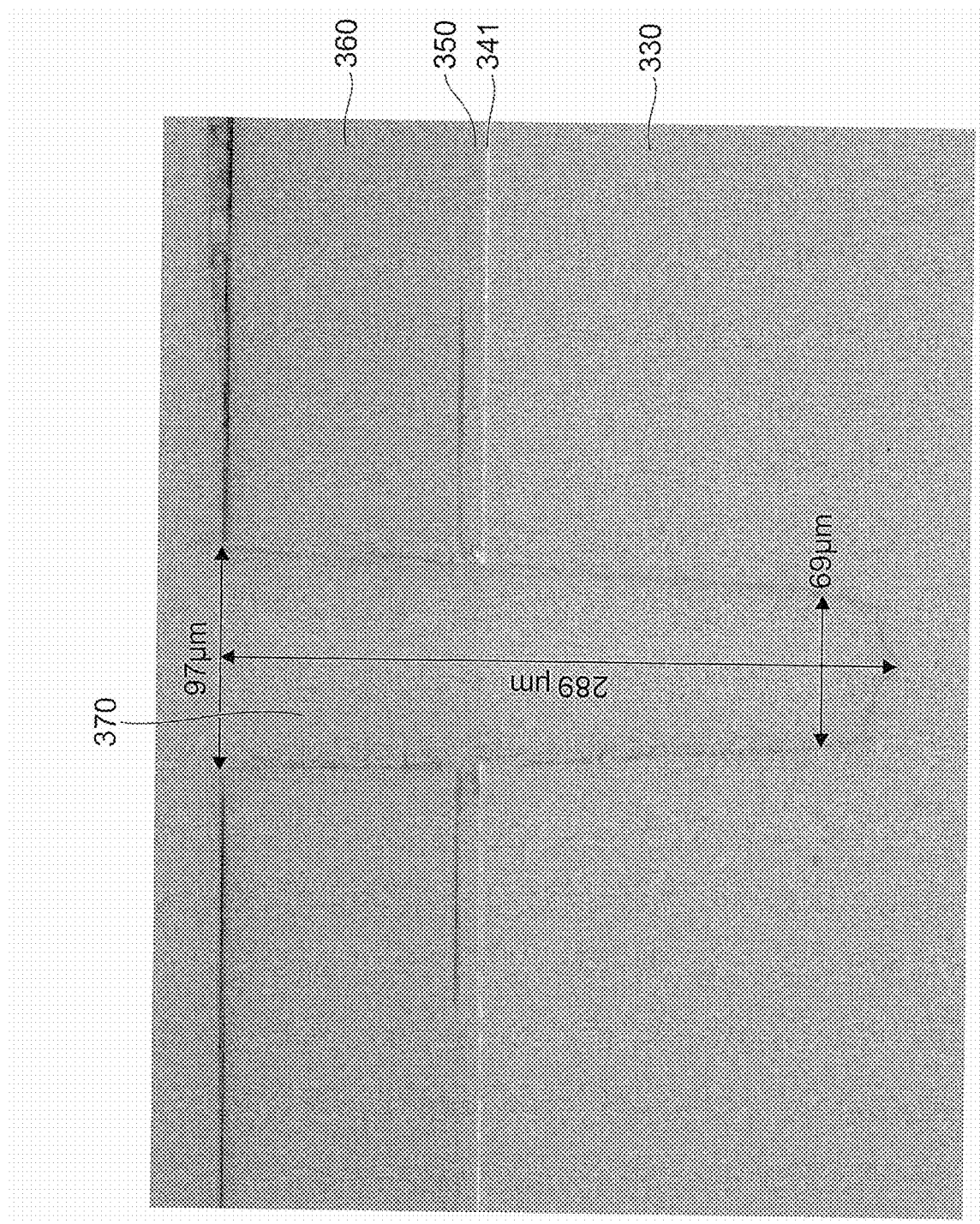
FIG. 7 depicts an optical microscope image of a cross section of a via hole drilled by excimer laser when an aluminum pad is used.

Referring to FIG. 7, there is shown an optical microscope image of a cross section of the via hole 370 drilled by excimer laser when the aluminum pad 341 is used. As shown in FIG. 7, the diameter of the via hole 370 is 97 micrometers at the top and 69 micrometers at the bottom, and the depth of the via hole 370 is 289 micrometers. The aluminum pad 341 is depicted in FIG. 7 as a thin white layer. The edge of the aluminum pad 341 is completely aligned to the side wall of the via hole 370. This result is not preferable in terms of achieving reliable electrical contact between the edge of the aluminum pad 341 and the conductive material filled into the via hole 370. This demonstrates that, although aluminum has a relatively high thermal conductivity and low optical absorption, these advantages are not much effective under these drilling conditions.

In contrast, platinum has the highest melting point in Table 1. In view of this, the present inventors used a platinum pad 342 as the metal pad 340, although platinum has a relatively low thermal conductivity and high optical absorption.

Referring to FIGS. 8A, 8B, 8C, and 8D, there are shown cross-section images of the via hole 370 drilled by laser when the platinum pad 342 is used.

FIGS. 8A and 8B each show a cross-section of the via hole 370 drilled by CO$_2$ laser. The angle of the wall of the via hole 370 was around 82 degrees. The platinum pads 342 remained clearly visible near the via hole 370 and were shaped like a bead, possibly due to high energy treatment by the CO$_2$ laser and high heat resistance of platinum.

FIGS. 8C and 8D each show a cross-section of the via hole 370 drilled by excimer laser. The angle of the wall of the via hole 370 was around 86.5 degrees. The platinum pad 342 shown in FIG. 8D did not remain around the via hole 370, possibly because it had been removed by the excimer laser mechanically. During the drilling process, the adhesive resin 350 around the via hole 370 was heated and dissipated by laser, and a dimple shape with a depth of around 10 micrometers was formed in the side wall of the via hole 370. After that, the platinum pad 342 adhered to the glass substrate 360 was removed. On the other hand, in FIG. 8C, the platinum pad 342 remained and the diameter of the via hole 370 at the underside of the glass substrate 360 was expanded.

From the above, as far as this evaluation is concerned, it is the most preferable to deposit the metal pad 340 under the adhesive resin 350, to use excimer laser as laser, and to use the platinum pad 342 as the metal pad 340.

Referring to FIGS. 9A and 9B, there are enlarged schematic drawings each illustrating a portion where the glass substrate 360 and the adhesive resin 350 are scraped by laser.

FIG. 9A corresponds to FIG. 8C. FIG. 9A shows that a scraped part 371 is formed on the side wall of the glass substrate 360, and a dimple 372 is generated in the adhesive resin 350.

FIG. 9B corresponds to FIG. 8D, but with a preferable change to what is shown in FIG. 8D. That is, while in FIG. 8D the metal pad 340 is removed from around the via hole 370 before the glass substrate 360 is scraped, the metal pad 340 of FIG. 9B remains around the via hole 370 after the glass substrate 360 is scraped. FIG. 9B thus shows that a scraped part 371 is formed on the side wall of the glass substrate 360, and a dimple 372 is generated in the adhesive resin 350.

In general, laser processing generates fume or debris that is then deposited on the surface of the drilled material. The metal pad 340 is also covered by at least some of them. Thus, if the metal pad 340 is exposed when viewed from the top of the via hole 370 like FIGS. 9A and 9B, the fume or debris on the metal pad 340 can be removed by reactive ion etching.

Although an etch rate of the glass substrate 360 by laser is assumed to be higher than an etch rate of the metal pad 340 by the laser in the foregoing, the etch rate of the glass substrate 360 by laser may be approximately equal to the etch rate of the metal pad 340 by the laser. In this case, a thermally dissipatable resin may be used as the adhesive resin 350.

Referring to FIGS. 10A and 10B, there are shown etching results with a thermally dissipatable resin used as the adhesive resin 350.

As shown in FIGS. 10A and 10B, each of stacked battery layers 315 and 325 may include a glass substrate 330, metal pads 340, adhesive resins 350, and glass substrates 360. In the stacked battery layers 315, each of the metal pads 340 is located on a corresponding one of the adhesive resins 350, while in the stacked battery layers 325, each of the metal pads 340 is located under a corresponding one of the adhesive resins 350. In each of the stacked battery layers 315 and 325, dimples 372 are formed in the adhesive resins 350 by laser, when a thermally dissipatable resin is used as a material of the adhesive resins 350. Thereby, the metal pads 340 are exposed to the via hole 370.

Alternatively, when the etch rate of the glass substrates 360 by laser is approximately equal to the etch rate of the metal pads 340 by the laser, the metal pads 340 may be exposed to the via hole 370 by control of the laser power.

To drill by laser the via hole 370 such that the metal pads 340 are exposed to the via hole 370, a method of drilling the via hole 370 by percussion using a Gaussian beam profile is the simplest, if available. However, both of CO$_2$ laser and excimer laser may not have a Gaussian beam profile, but have a square wave profile. Thus, it is necessary to control the laser power by using the square wave profile as in a case of using the Gaussian beam profile.

Figure 11:
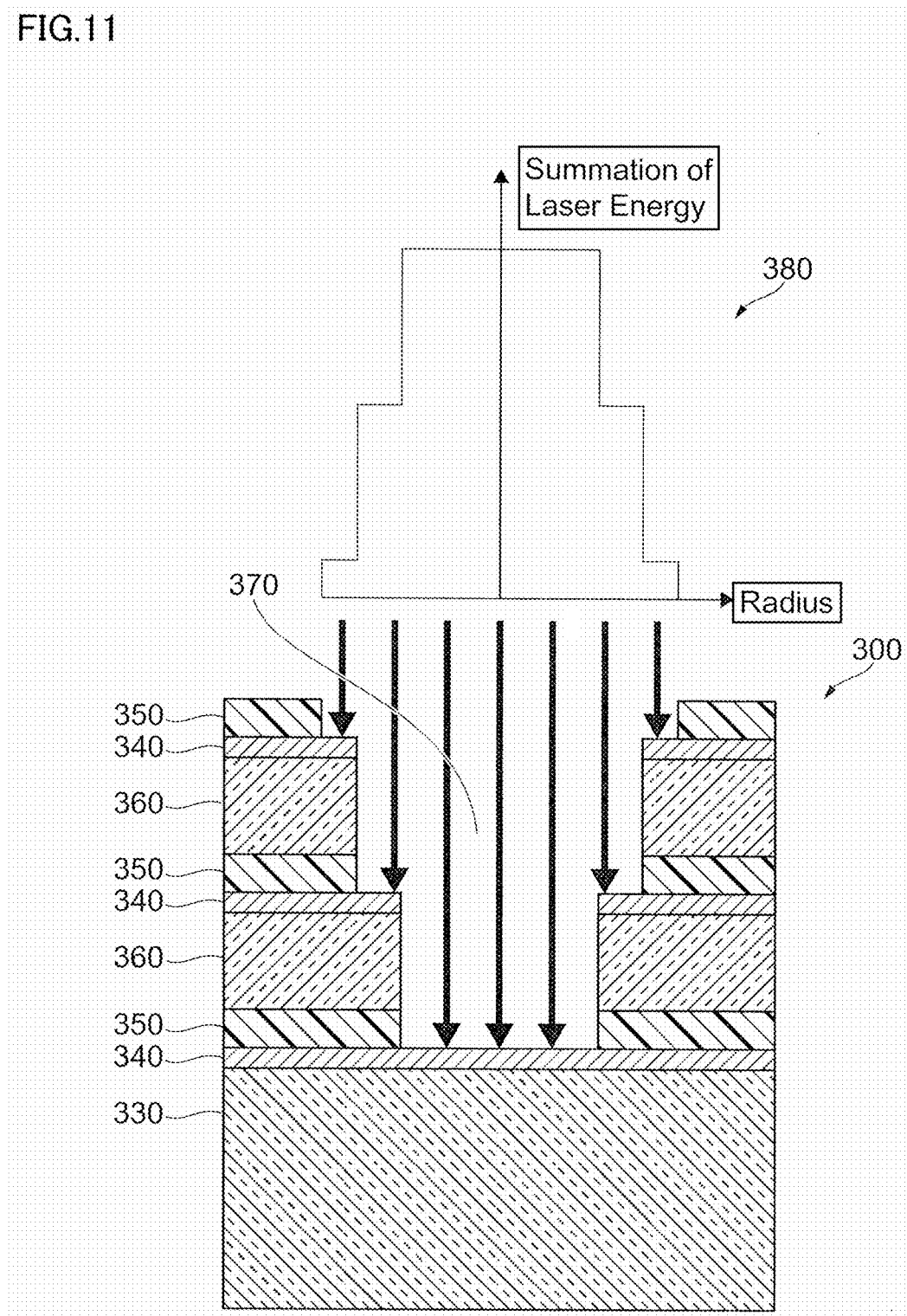
FIG. 11 depicts a schematic drawing of control of a laser power using a square wave profile.

Referring to FIG. 11, there is shown a schematic drawing of control of the laser power using the square wave profile.

As shown in FIG. 11, a method of drilling the via hole 370 may be a helical drilling method by using the square wave profile. In this method, summation of the laser energy may be controlled along with the radius of the via hole 370, as indicated by a graph 380. By this control of the laser energy, the number of percussions may be controlled along with the radius, as indicated by lengths of arrows in the figure indicating an irradiation direction of the laser. Thereby, the via hole 370 formed in a stacked battery layer 300 may obtain a shape similar to a shape obtained by using the Gaussian beam profile. As a result, the metal pads 340 may be exposed to the via hole 370.

Note that the first exemplary embodiment may be modified so that a high reflective material such as silver or silver alloy is deposited on the metal pad 340. Thereby, selectivity of materials of the metal pad 340 may be improved.

Further, the shape of the via hole 370 is not limited to a circular shape. The shape of the via hole 370 may be a rectangular shape or other shape.

Furthermore, the via hole 370 is not limited to a blind via. The via hole 370 may be a through via.

Although an explanation has been given of the stacked battery structure in the first exemplary embodiment, the present invention is applicable to a general stacked device structure. In view of this, in the second exemplary embodiment, an explanation is given of a fabrication of a stacked device structure.

Figure 12:
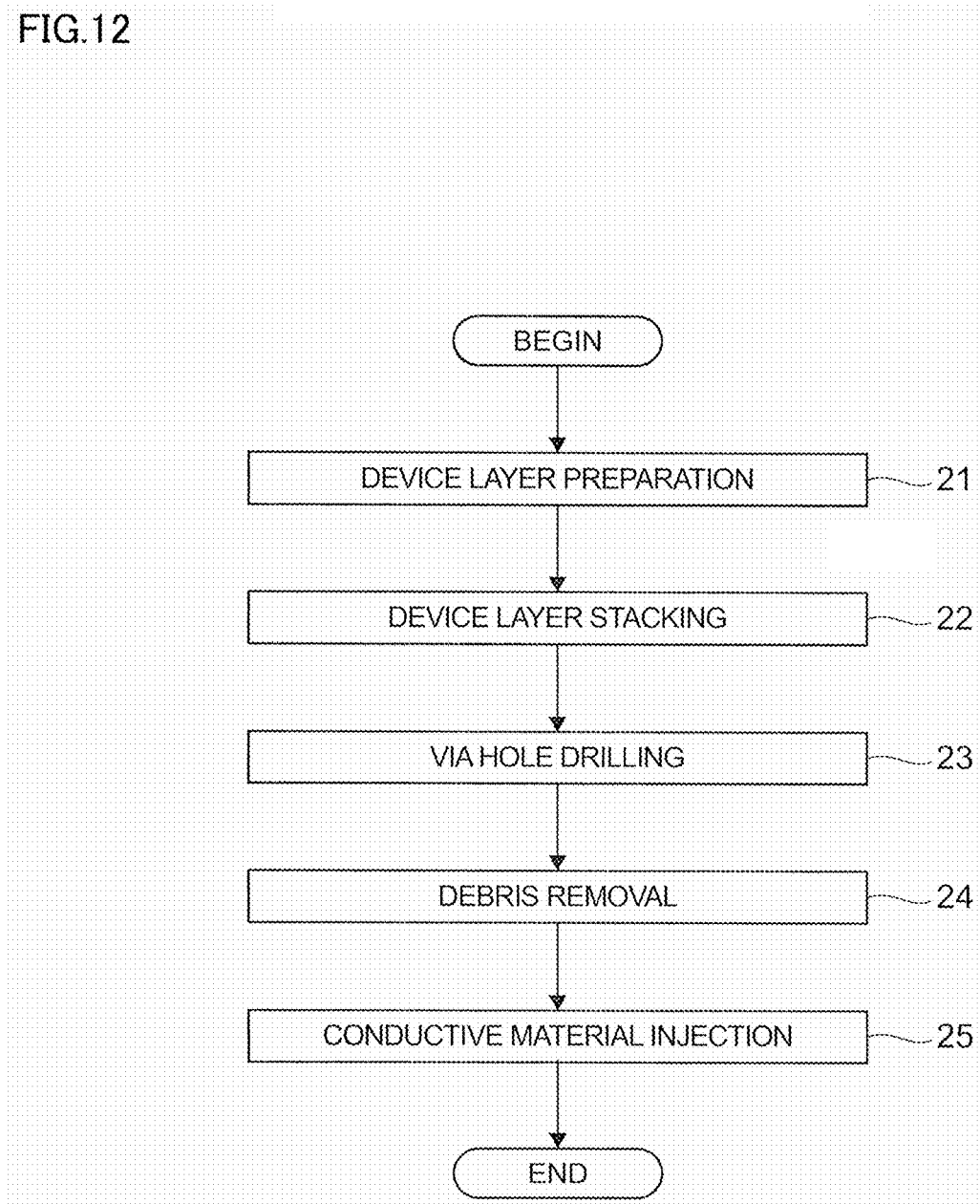
FIG. 12 depicts a flowchart representing an example of a fabrication procedure of a stacked device structure according to the second exemplary embodiment.

Referring to FIG. 12, there is shown a flowchart representing an example of a fabrication procedure of the stacked device structure according to the second exemplary embodiment. As shown in FIG. 12, the fabrication procedure may include, in time order, a device layer preparation step 21, a device layer stacking step 22, a via hole drilling step 23, a debris removal step 24, and a conductive material injection step 25.

First, the device layer may be prepared at the device layer preparation step 21. The device layer may be constructed by depositing a metal pad on a glass substrate and depositing an adhesive resin on the metal pad, or by depositing an adhesive resin on a glass substrate and depositing a metal pad on the adhesive resin. The glass substrate serves as one example of the claimed glass layer. The metal pad serves as one example of the claimed metal layer. The adhesive resin serves as one example of the claimed resin layer.

Next, the device layer may be stacked to form stacked device layers at the device layer stacking step 22.

The subsequent steps 23 to 25 are the same as the steps 13 to 16 of the first exemplary embodiment.

The second exemplary embodiment does not need high temperature annealing. Thus, the second exemplary embodiment does not limit a material of the glass substrates 220 to non-alkaline glass. As a result, laser used to drill a via hole is not limited to $CO_2$ laser or excimer laser. That is, the types of glass and metal may be selected so that an etch rate of glass by laser is higher than an etch rate of metal by the laser.

Alternatively, as described in the first exemplary embodiment, the types of glass and metal may be selected so that an etch rate of glass by laser is approximately equal to an etch rate of metal by the laser. In this case, a thermally dissipatable resin may be used as the adhesive resin.

Note that the second exemplary embodiment may be modified so that a high reflective material such as silver or silver alloy is deposited on the metal pad. Thereby, selectivity of materials of the metal pad may be improved.

In the third exemplary embodiment, an explanation is given of an electronic apparatus mounted with the stacked device structure described in the second exemplary embodiment. The electronic apparatus may be, for example, a personal computer, a mobile phone, or the like.

Figure 13:
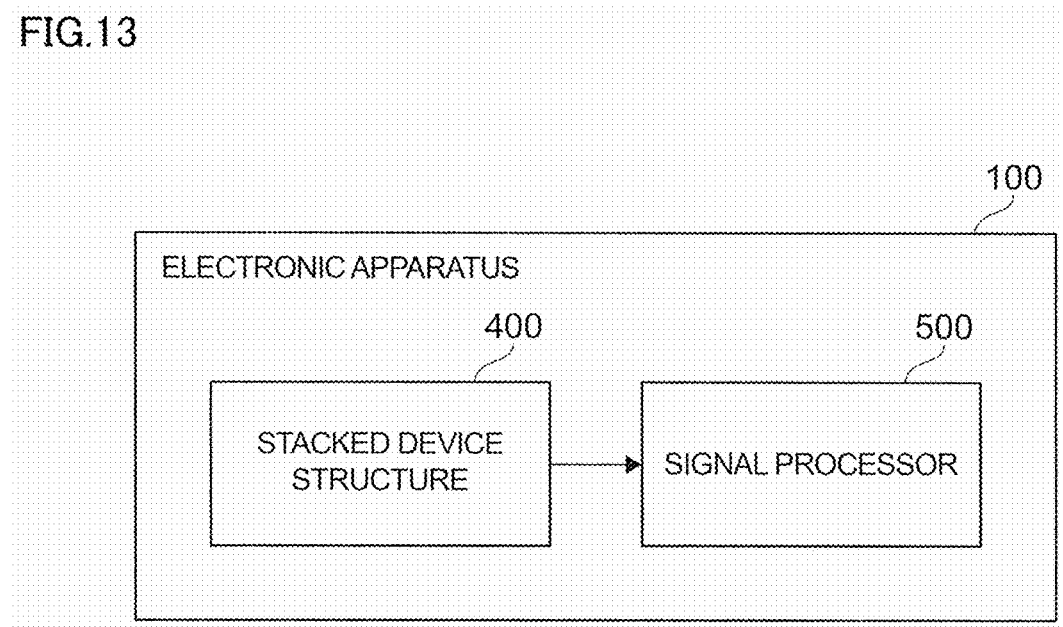
FIG. 13 depicts a block diagram of an electronic apparatus according to the third exemplary embodiment.

Referring to FIG. 13, there is shown a block diagram of an electronic apparatus 100 according to the third exemplary embodiment. As shown in FIG. 13, the electronic apparatus 100 may include a stacked device structure 400 and a signal processor 500. The stacked device structure 400 corresponds to the stacked device structure fabricated in the second exemplary embodiment. The signal processor 500 may process a signal outputted from the stacked device structure 400.

What is claimed is:

1. A method for fabricating a stacked battery structure, the method comprising:
   preparing a plurality of battery layers each having a metal layer, an adhesive resin layer on the metal layer, and a glass layer on a side of the adhesive resin layer opposite to the metal layer, and battery elements, the metal layer including a corresponding one of a plurality of anode electrodes and a corresponding one of a plurality of cathode electrodes, the battery elements including an anode coupled to the corresponding one of the plurality of anode electrodes, a cathode coupled to the corresponding one of the plurality of cathode electrodes, and an electrolyte deposited between the anode and the cathode;
   stacking the plurality of battery layers to compose stacked battery layers;
   drilling vertically a first hole and a second hole through the stacked battery layers by laser, from a same side as the glass layer of a top device layer of the plurality of layers, after stacking the plurality of battery layers, such that top surfaces of the plurality of anode electrodes are exposed around the first hole, where the first hole penetrates the anode electrodes, and top surfaces of the plurality of cathode electrodes are exposed around the second hole, where the second hole penetrates the cathode electrodes; and
   filling conductive material into the first hole to connect the plurality of anode electrodes, and into the second hole to connect the plurality of cathode electrodes.

2. The method of claim 1, wherein an etch rate of the glass layer by the laser is higher than an etch rate of the metal layer by the laser.

3. The method of claim 2, wherein the glass layer is a non-alkaline glass layer.

4. The method of claim 3, wherein
   the laser has a first wavelength shorter than 300 nanometers, and
   an absorption rate of the glass layer at the first wavelength is higher than an absorption rate of the metal layer at the first wavelength.

5. The method of claim 4, wherein
   the metal layer is deposited under the resin layer,
   the laser is excimer laser, and
   the metal layer is a platinum layer.

6. The method of claim 3, wherein
   the laser has a second wavelength longer than 6 micrometers, and
   an absorption rate of the glass layer at the second wavelength is higher than an absorption rate of the metal layer at the second wavelength.

7. The method of claim 1, wherein an etch rate of the glass layer by the laser is approximately equal to an etch rate of the metal layer by the laser.

8. The method of claim 7, wherein the resin layer is thermally dissipatable.

9. The method of claim 1, wherein silver or a silver alloy is deposited on the metal layer.

10. A method for fabricating a stacked device structure, the method comprising:
    preparing a plurality of device layers each having a metal layer, an adhesive resin layer on the metal layer, and a glass layer on a side of the adhesive resin layer opposite to the metal layer;

stacking the plurality of device layers to compose stacked device layers;

drilling vertically a hole through the stacked device layers by laser, from a same side as the glass layer of a top device layer of the plurality of layers, after stacking the plurality of battery layers, such that top surfaces of the metal layers of the plurality of device layers are exposed around the hole where the hole penetrates the metal layers; and filling conductive material into the hole to connect the plurality of metal layers.

11. The method of claim 10, wherein an etch rate of the glass layer by the laser is higher than an etch rate of the metal layer by the laser.

12. The method of claim 10, wherein an etch rate of the glass layer by the laser is approximately equal to an etch rate of the metal layer by the laser.

13. The method of claim 12, wherein the resin layer is thermally dissipatable.

14. The method of claim 10, wherein silver or a silver alloy is deposited on the metal layer.

15. The method of claim 10, wherein the laser has a square wave profile.

16. The method of claim 10, wherein the laser has a Gaussian profile.

17. The method of claim 10, wherein drilling the hole removes material laterally from the resin layer to form dimples in sidewalls of the hole.

18. The method of claim 10, further comprising etching away debris from the metal layers, after drilling, using a reactive ion etch.

19. The method of claim 10, wherein drilling the hole may remove material from the glass layer and the metal layer at approximately the same rate.

20. The method of claim 10, wherein the laser is an excimer laser.

21. The method of claim 10, wherein drilling vertically through the glass layers of the plurality of device layers forms a scraped area at the bottom surface of the glass layers, the scraped area having a flat sidewall.

22. The method of claim 21, wherein drilling vertically through the adhesive resin layers of the plurality of device layers forms a scraped area that has a concave surface, with the scraped areas of the glass layer and the adhesive resin layers joining to form a combined scraped area that exposes the top surfaces of the metal layers.

* * * * *